Oct. 17, 1967  B. MERICLE, JR  3,347,542
TOGGLE CLAMP
Filed April 19, 1965

INVENTOR
BOYD MERICLE JR.
BY *Beaman & Beaman*
ATTORNEYS

United States Patent Office 3,347,542
Patented Oct. 17, 1967

3,347,542
TOGGLE CLAMP
Boyd Mericle, Jr., Jackson, Mich., assignor, by mesne assignments, to Seizer Power Clamp, Inc., Detroit, Mich.
Filed Apr. 19, 1965, Ser. No. 449,036
7 Claims. (Cl. 269—32)

ABSTRACT OF THE DISCLOSURE

A hold-down toggle clamp, including a hold-down lever, actuated by a reciprocal actuator wherein the toggle linkages are so mounted and associated with the actuator that the clamp may be of a concise configuration and is capable of producing high hold-down forces by maintaining the linkages linearly aligned when the lever is in clamped position.

---

Various manufacturing techniques require the use of clamping means to hold a workpiece or article in a stationary position upon a die, worktable, fixture, reference surface, or other similar supporting member. Devices for holding down such articles often are in the form of toggle clamps wherein a hold-down lever is operated either manually or by a power device through a linkage system for selective pivoting of the lever between hold-down and release positions. Such toggle clamps normally include a movable pivot axis which passes through an "overcenter" relationship to provide the locking action. Such "overcenter" toggle clamps prevent accidental release of the lever from the hold-down position but require high forces to bring the toggle "past" center. Also, "overcenter" toggle clamps do not produce the maximum hold-down pressures of which the clamp is capable, in that the passing of the point beyond the center reduces the holding force of which the hold-down lever is capable.

It is an object of the invention to provide a toggle clamp employing a hold-down lever which may be rotated through at least 90° of pivotal movement to provide a "full opening" clamp.

A further object of the invention is to provide a toggle clamp wherein an "overcenter" relationship is not produced and wherein the maximum hold-down capabilities of the clamp are effectively utilized.

A further object of the invention is to provide a power-operated toggle clamp which does not incorporate an "overcenter" relationship, yet will maintain a locked position even after the power means producing actuation of the clamp is deenergized.

Yet a further object of the invention is to produce a power-actuated toggle clamp which may be constructed of a very concise configuration and, yet, is capable of producing high hold-down pressures for performing the aforementioned objects.

Another object of the invention is to provide a power-actuated toggle clamp which is of an economical, dependable and rigid construction capable of a long service life with little maintenance.

Figure 1:
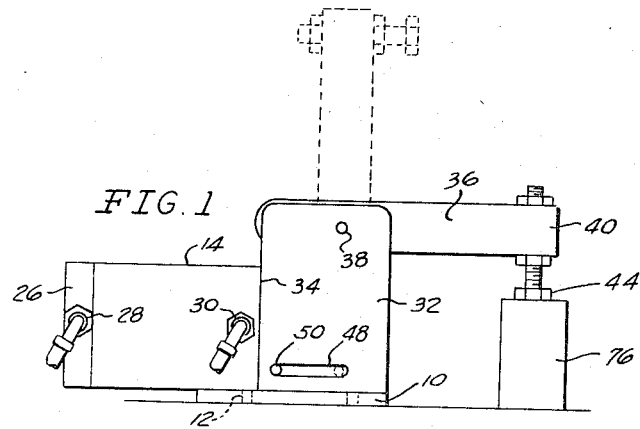
Figure 2:
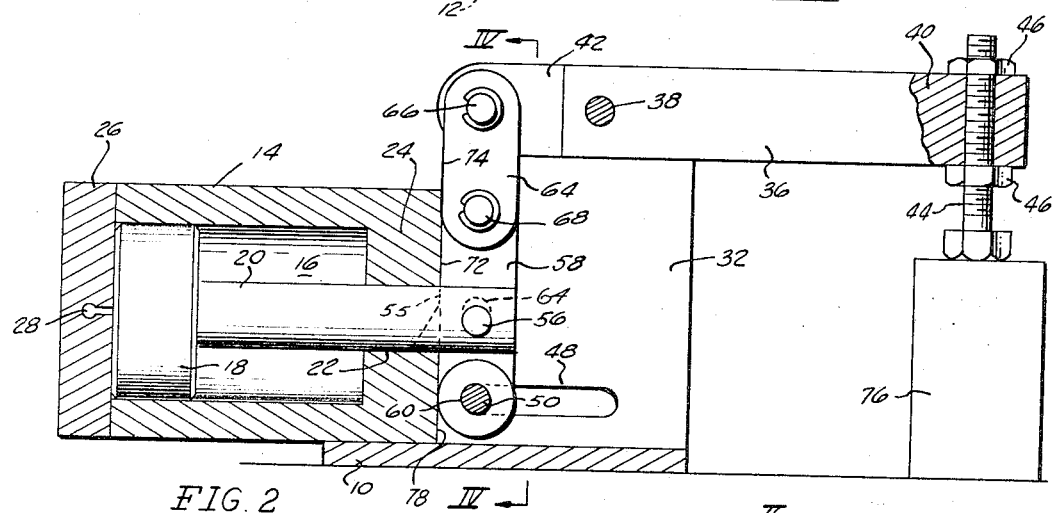
Figure 3:
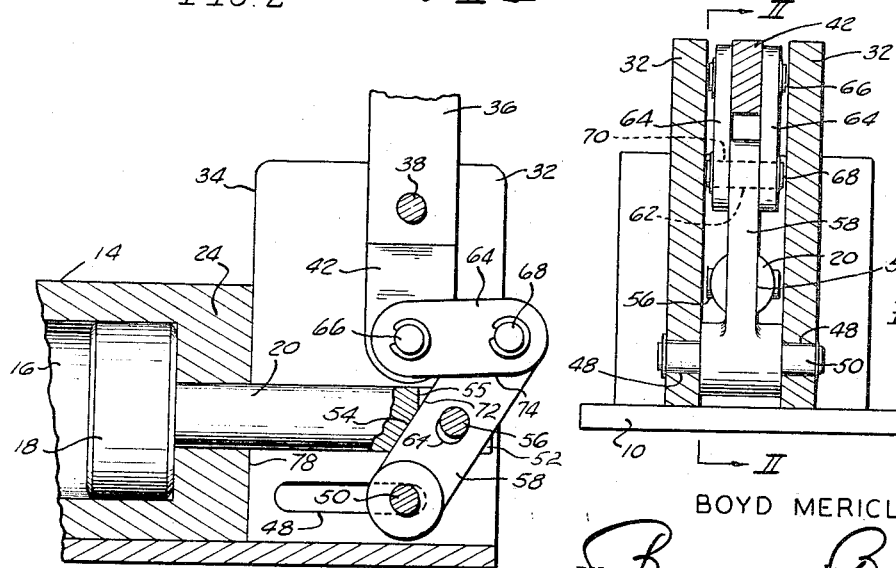
Figure 4:
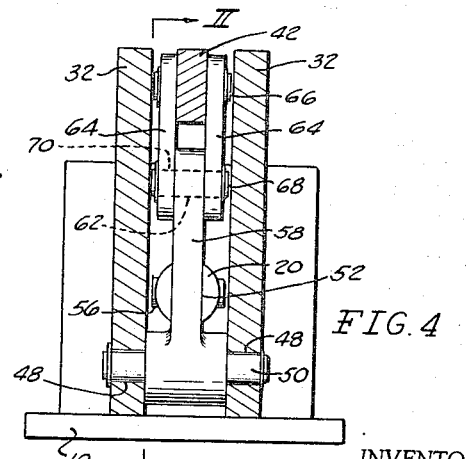

These and other objects of the invention will be apparent from the following description and the relationships of the components of an embodiment thereof wherein:

FIG. 1 is a side, elevational view of a toggle clamp in accord with the invention, the release position of the hold-down lever being illustrated in dotted lines, FIG. 2 is a sectional, enlarged, elevational view as taken along section II—II of FIG. 4, the expandable motor components being shown in diametrical section, and the hold-down lever being shown in the operative position, FIG. 3 is a detail, elevational, sectional view similar to FIG. 2, illustrating the hold-down lever and other components in the full release position, and FIG. 4 is an elevational, sectional view taken along section IV—IV of FIG. 2.

The toggle clamp in accord with the invention includes a base plate 10 having mounting holes 12 defined therein whereby the clamp may be mounted on a supporting surface. An expandable motor cylinder 14 is supported upon the base plate 10 and includes a cylindrical chamber 16 in which a piston 18 is reciprocally mounted. A piston rod 20 is attached to the piston 18 and extends through a bore 22 defined in the head 24. A removable head 26 is attached to the outer end of the cylinder 14 and includes a port 28 in communication with the cylinder chamber. A port 30 is defined in the head 24 in communication with the cylinder chamber 16 on the opposite side of the piston 18.

A pair of spaced, parallel plates 32 are mounted upon the base plate 10 in parallel relation to the piston rod 20. Preferably, one edge 34 of the plates 32 abuts the head 24. As will be apparent from FIG. 4, the axis of the piston rod 20 is centrally disposed between the plates 32.

A hold-down lever 36 is pivotally mounted between the plates 32 upon a pivot pin 38 extending between the plates. The hold-down lever 36 includes an article-engaging end 40 and an inner end 42. A conventional article-engaging screw 44 is disposed within the threaded hole in the lever end 40 and has a pair of lock nuts 46 associated therewith for locking the position of the screw to the lever.

The plates 32 are each provided with a linear, elongated slot 48 disposed below the piston rod 20. The slots 48 are parallel to the piston rod 20 and oppositely disposed to each other and receive a pivot pin 50 therein which extends between the plates, as will be apparent from FIG. 4.

The outer end of the piston rod 20 is provided with a vertically disposed diametrical slot 52 including an obliquely related surface 54 and a vertically disposed shoulder surface 55. A pivot pin 56 extends through piston rod 20 through the slot 52.

A link 58 is received within the piston rod slot 52 and includes a lower hole 60 and an upper hole 62 at opposite ends thereof. The lower end of link 58 is enlarged to have a transverse width substantially equal to the spacing between plates 32. The link 58 also includes an elongated slot 64 through which the pivot pin 56 extends. The slot 64 is elongated in the direction of a line drawn between the center of the holes 60 and 62.

A link 64, which actually consists of a pair of spaced links disposed on opposite sides of the link 58, FIG. 4, is pivotally connected to the inner end 42 of the hold-down lever 36 by a pivot pin 66. The link 64 includes a hole 70 whereby a pivot pin 68 pivotally interconnects the links 58 and 64. The pivot pin 50 is inserted through the link hole 60, thereby connecting the lower end of the link 58 to the support plates 32 for pivotal movement thereto, as well as the sliding movement permitted by the slots 48.

Conventional washers and snap rings are employed with the pivot pins to maintain the pivot pins in their desired positions.

The links 58 and 64 are each provided with flat reference surfaces 72 and 74, respectively, defined thereon which are adapted to engage the planar locating surface 78 defined on the head 24. The purpose of these surfaces will be apparent from the following description of the operation of the invention.

In operation, "extension" of the piston rod 20 to the position shown in FIG. 3 will cause the components to assume the relationship illustrated. The pivot pin 50 will be located within the slots 48 at the remote position relative to the head 24, and the pivot pin 56 will be located within the slot 64, as shown. Clearance for link 58 within slot 52 is provided by the oblique surface 54. The distance between the pivot pins 50 and 68 and the pivot pins 68 and 66 is such that when the piston rod is fully extended, the hold-down lever 36 will be substantially vertically disposed, as shown. In this position, the workpiece 76 may be located as desired upon a die or other supporting surface.

The introduction of pressurized oil or air into the port 30 will cause the piston 18 to shift to the left, as shown in FIG. 2. This "retraction" of the piston rod 20 will pull the link 58 toward the head 24. During this movement the pin 50 will be sliding within the slots 48 and the hold-down lever 36 will be pivoting in a clockwise direction about pin 38 toward the hold-down piston.

The length of the cylinder chamber 16 is such that the piston 18 engages the head 26 at the same time that the link reference surfaces 72 and 74 engage the locating surface 78 defined upon the head 24.

In the above relationship, the axes of the pivot pins 66, 68, 56 and 50 are in linear alignment, i.e., are within the same plane. At this position, the hold-down lever 36 is at the operative hold-down position as shown in full lines in FIGS. 1 and 2. In FIGS. 1 and 2 the article being held down is indicated at 76.

As the maximum hold-down forces produced within the lever 36 occur when the pivot pins 66, 68 and 50 are in alignment, the invention utilizes the maximum capabilities of the apparatus, in that the operative position of the linkages is "on center" rather than "overcenter," as is the normal construction of toggle clamps.

The piston rod slot shoulder 55 engages the reference surface 72 of link 58 when the link 58 is vertical. Thus, the shoulder 55 prevents the link 58 from pivoting in a counterclockwise direction on pin 56 past the vertical relationship and insures full retraction of the piston rod and proper movement and relationships of the links.

By utilizing the slots 48 and 64, a full 90° rotation of the hold-down lever 36 can be produced with a relatively short stroke of the piston rod 20. The relationship of the components of the invention permits a very concise power-actuated toggle clamp to be provided, and in a commercial embodiment of the invention, the overall distance between the head 26 and the end 40 of the hold-down lever is less than eleven inches.

Release of the hold-down lever 36 is accomplished by movement of the piston rod 20 to the right which causes the link 58 to move to the right as the pin 50 slides in the slots 48. Movement of the piston rod to the right is preferably limited by engagement of the piston 18 with the head 24.

It is appreciated that embodiments other than that illustrated may be apparent to those skilled in the art without departing from the spirit and scope of the invention, and it is intended that the invention be defined only by the scope of the following claims.

What is claimed is:

1. A toggle clamp comprising, in combination:
  (a) a support plate,
  (b) a hold-down lever pivotally mounted on said support plate selectively movable between hold-down and release positions,
  (c) an expandable motor mounted adjacent said support plate having a planar reference surface defined thereon and having a reciprocable piston movable between hold-down and release positions,
  (d) a first link having first and second pivot means associated therewith and a planar reference surface defined thereon, said first pivot means pivotally connecting said first link to said support plate,
  (e) a second link pivotally connected to said hold-down lever by a third pivot means, said first link second pivot means pivotally interconnecting said first and second links,
  (f) fourth pivot means interconnecting said piston and said first link adjacent said first link reference surface,
  (g) said first link reference surface engaging said motor reference surface positioning said first, second and third pivot means in linear alignment upon actuation of said piston to said hold-down position.

2. A toggle clamp comprising, in combination:
  (a) a support plate,
  (b) a hold-down lever pivotally mounted on said support plate selectively movable between hold-down and release positions,
  (c) a reciprocal actuator mounted adjacent said support plate movable between hold-down and release positions,
  (d) a first link having first and second pivot means associated therewith, said first pivot means pivotally connecting said first link to said support plate,
  (e) a second link pivotally connected to said hold-down lever by a third pivot means, said first link second pivot means pivotally interconnecting said first and second links,
  (f) fourth pivot means interconnecting said actuator and said first link,
  (g) lost motion means supporting said first pivot means upon said support plate for translatory movement thereon,
  (h) said first, second and third pivot means linearly aligning upon actuation of said actuator to said hold-down position.

3. A toggle clamp comprising, in combination:
  (a) a support plate,
  (b) a hold-down lever having an article-engaging end and an inner end, a pivot located between said ends pivotally mounting said lever upon said plate,
  (c) a reciprocal actuator mounted adjacent said support plate movable between hold-down and release positions,
  (d) a first link having first and second pivot means associated therewith, said first pivot means pivotally connecting said first link to said support plate,
  (e) a second link pivotally mounted to said hold-down lever inner end by a third pivot means, said first link second pivot means pivotally interconnecting said first and second links,
  (f) fourth pivot means connecting said actuator to said first link intermediate said first and second pivot means, and
  (g) means positioning said first, second, third and fourth pivot means in linear alignment upon actuation of said actuator to said hold-down position.

4. A toggle clamp comprising, in combination:
  (a) a support plate,
  (b) a hold-down lever having an article-engaging end and an inner end, a pivot located between said ends pivotally mounting said lever upon said plate,
  (c) a reciprocal actuator mounted adjacent said support plate movable between hold-down and release positions,
  (d) a first link having first and second pivot means associated therewith, said first pivot means pivotally connecting said first link to said support plate,
  (e) a second link pivotally mounted to said hold-down lever inner end by a third pivot means, said first link second pivot means pivotally interconnecting said first and second links,
  (f) fourth pivot means connecting said actuator to said first link intermediate said first and second pivot means,
  (g) an elongated slot defined in said support plate substantially parallel to the path of movement of said actuator, said first pivot means including an extension received within said slot comprising the connection of said first pivot means to said support plate, and (h) means positioning said first, second and third pivot means in linear alignment upon actuation of said actuator to said hold-down position.

5. In a toggle claim as in claim 4 wherein:
(a) an enlongated slot is defined in said first link, said fourth pivot means comprising a pin mounted within said actuator extending into said slot defined in said first link.

6. A toggle clamp characterized by its ability to be fully retracted from the article being held down and its concise configuration comprising, in combination:
(a) an expandable motor having a head and a reciprocal piston rod extending through said head movable between hold-down and release positions,
(b) a pair of spaced, parallel support plates mounted adjacent said head substantially parallel to said poston rod,
(c) a hold-down lever having an article-engaging end and an inner end located between said plates, a pivot located between said ends pivotally mounting said lever upon said plates,
(d) a first link disposed between said plates having first and second pivot means associated therewith,
(e) parallel, opposed, elongated, linear slots defined in said support plates parallel to said piston, said first pivot means comprising a pin within said slots and extending through said first link,
(f) a second link disposed between said plates pivotally connected to said inner end of said hold-down lever by a third pivot means, said first link second pivot means pivotally interconnecting said first and second links,
(g) a slot defined in said first link extending in the direction of a line interconnecting said first and second pivot means and located therebetween,
(h) a fourth pivot means mounted on said piston rod, said fourth pivot means comprising a pin mounted on said piston rod and extending into said slot defined in said first link, the distance between said first and second pivot means, and said second and third pivot means being such that movement of said piston between said hold-down and release positions produces substantially a 90° pivotal movement of said hold-down lever, and
(i) means positioning said first, second and third pivot means in linear alignment upon actuation of said piston to said hold-down position.

7. In a toggle clamp as in claim 6 wherein:
(a) said means positioning and aligning said pivot means comprises reference surfaces defined on said first and second links and a locating surface defined on said head, said reference surfaces engaging said locating surface upon movement of said piston rod to said release position.

References Cited

UNITED STATES PATENTS 3,027,155  3/1962  Paterson _____ 269—32

FOREIGN PATENTS 208,234  5/1957  Australia.
908,318  9/1945  France.

ROBERT C. RIORDON, *Primary Examiner.*

J. F. McKEOWN, *Assistant Examiner.*